United States Patent
Malomsoky et al.

(10) Patent No.: US 7,865,207 B2
(45) Date of Patent: Jan. 4, 2011

(54) METHOD AND APPARATUS FOR LARGE SCALE ANALYSIS OF PUSH-TO-TALK TRAFFIC

(75) Inventors: Szabolcs Malomsoky, Szentendre (HU); Tamas Varga, Budapest (HU); Lajos Zaccomer, Budapest (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 600 days.

(21) Appl. No.: 11/910,127

(22) PCT Filed: Mar. 31, 2005

(86) PCT No.: PCT/EP2005/003378

§ 371 (c)(1),
(2), (4) Date: Sep. 28, 2007

(87) PCT Pub. No.: WO2006/102915

PCT Pub. Date: Oct. 5, 2006

(65) Prior Publication Data
US 2008/0188188 A1    Aug. 7, 2008

(51) Int. Cl.
*H04B 7/00* (2006.01)
*H04Q 7/20* (2006.01)

(52) U.S. Cl. ............... 455/519; 455/517; 455/509; 455/90.2

(58) Field of Classification Search .............. 455/90.2, 455/416, 519, 518, 520, 521, 509, 514, 517, 455/452.1, 423, 67.11
See application file for complete search history.

(56) References Cited

U.S. PATENT DOCUMENTS 7,155,248 B2 * 12/2006 Idnani ................ 455/519
2004/0192363 A1 * 9/2004 Rosetti et al. ........... 455/509

OTHER PUBLICATIONS

Kim P et al. : "IMS-based push-to-talk over GPRS/UMTS" wireless communications and networking conference, 2005 IEEE New Orleans, LA, USA Mar. 13-17, 2005, Oiscataway, NJ, USA, IEEE, Mar. 13, 2005, pp. 2472-2477, XP010791564.*
Kim P et al: "IMS-based push-to-talk over GPRS/UMTS" Wireless Communications and Networking Conference, 2005 IEEE New Orleans. LA, USA Mar. 13-17, 2005, pp. 2472-2477, XP010791564.

* cited by examiner

*Primary Examiner*—John Lee

(57) ABSTRACT

To provide a solution for efficient and large-scale characterization of push-to-talk service performance in a mobile communication environment there is described a method and apparatus for passive evaluation of push-to-talk traffic in a communication network. After capturing (S10) data transactions in the communication network there follows a step of extracting (S12) interpretations of data transactions being relevant for push-to-talk, traffic classes, and users, from captured data transactions. Then a correlation of extracted interpretations of data transactions being relevant for push-to-talk, traffic classes, and users is stored (S14) in a traffic data base. This allows to calculate (S16) at least one performance indicator with respect to at least one selected push-to-talk session as a function of information stored in the traffic database.

50 Claims, 8 Drawing Sheets

METHOD AND APPARATUS FOR LARGE SCALE ANALYSIS OF PUSH-TO-TALK TRAFFIC

FIELD OF INVENTION

The present invention relates to a method of large scale analysis of push-to-talk traffic in a communication network, a apparatus for large scale analysis of push-to-talk traffic in a communication network, and a corresponding computer program product.

BACKGROUND ART

The purpose of packet switched push-to-talk services is to provide half-duplex voice communication with one or more subscribers eliminating the need for radio transmission while someone else speaks, e.g., as known from walkie-talkie systems.

The basic control mechanism underlying packet switched push-to-talk services, also referred to as floor-control mechanism in the following, guarantees that if a subscriber obtains the permission to talk, e.g., by pressing a dedicated push-to-talk button, then s/he can talk while further subscribers listen until resigning of the active subscriber, e.g., by releasing the push-to-talk button. The push-to-talk service is also designed to simply send and receive voice messages to at least one subscriber selected from an address book of a mobile terminal.

Currently established standards for push-to-talk services only define user-network functions, excluding functions that are based on presence information, and functions necessary to achieve mobile station compatibility at initial deployment of push-to-talk services. Therefore, inter-operability of multiple push-to-talk systems, in particular over wireless communication systems, is left undefined.

FIG. 1 shows a currently established push-to-talk system provided and relying on the Internet protocol IP multimedia subsystem IMS concept, as standardized in 3GPP.

As shown in FIG. 1, for delivery of push-to-talk services there is established a connection between a mobile station 10, an application server 12, and an IP multimedia system 14, via a wireless access network 16, a core network 18, and a service network 20. The mobile station 10 connects to the access network via a base transceiver station 22 being operated under control of the base station controller 24.

As shown in FIG. 1, the inter-working between the access network 16 and the core network 18 is achieved through a serving GPRS support node 26, and the inter-working between the core network 18 and the service network 20 is achieved by the gateway GPRS support node 28. For exchange of data in the different sub-systems, the references Abis, Gb, Gp, Gp, Gn, Gi indicate different interfaces defined, e.g., according to 3GPP, which are commonly known to the skilled person and will therefore not be explained in detail here.

As shown in FIG. 1, the IP multimedia system 14 divides into a call session control function 30 and a media resource function 32.

As shown in FIG. 1, besides the IP multimedia system 14, the application server 12 is provided for group management purposes, e.g., as group list management server GLMS. Also, the communication between the mobile station 10 and the push-to-talk components in the service network uses three push-to-talk over cellular interfaces:

A group management interface Im is used to manipulate access lists and group memberships through a hypertext transfer protocol (HTTP) based on an extension markup language XML protocol, Push-to-talk over Cellular (PoC) Technical Specification, List Management and Do-not-Disturb, PoC Release 1.0, V1.1.3, August 2003.

A signaling interface (Is) is used for session management purposes, Push-to-talk over Cellular (PoC) Technical Specification, Signaling Flows, PoC Release 1.0, V1.1.0, August 2003. The session initiation protocol SIP, IETF RFC 2543 and the session description protocol SDP, IETF RFC 2327 protocols are deployed for session management. These protocols may also be subject protocol compression using SigComp, IETF RFC 3320 and 3321.

The traffic interface It is used for floor control and voice transmission, Push-to-talk over Cellular (PoC) Technical Specification, Transport Protocols, PoC Release 1.0, V1.1.0, August 2003. Heretofore, an audio/video profile/real-time transport protocol AVP/RTP, IETF RFC 3550 conveys speech samples, and the real-time transport control protocol RTCP, IETF RFC 3605 transmits quality reports at the end of push-to-talk bursts. Further, floor-control messages are delivered in application specific extension fields in RTCP headers.

It should be noted that insofar as reference is made to different protocols, these protocols will be considered as known to the person skilled in the art and will therefore not be explained in more detail but included herein by reference.

Having regard to the push-to-talk architecture shown in FIG. 1, one important issue for operation of such a system is the analysis of provided push-to-talk services. In other words, the potential of push-to-talk services largely depends on its performance because quick access and good speech quality are inevitable pre-requisites for high subscriber penetration.

Therefore, monitoring of push-to-talk performance is especially important during actual operation of the system, where performance problems need to be detected before a larger part of the subscriber population is affected and where the adequate information for trouble-shooting has to be obtained.

As will be outlined in the following, currently only active measurements techniques are available to test performance of push-to-talk services.

One first example is push-to-talk over-the-air, Push-to-Talk Over-the-Air Test System, SPIRENT Communications, 4/04 v.1, http://www.spirentcom.com/documents/1377.pdf, which offers automated active measurement based performance tests for mobile stations and networks. The primary goal of this tool is to perform end-to-end voice quality analysis and service access delay measurements. This test system is connected to two mobile stations that are involved in the quality measurement. Therefore, while it is possible to measure an actual end-to-end performance, this is only achieved between two specific mobile stations.

Further, while active monitoring is quite accurate for a specific push-to-talk session, it is also very cumbersome. In other words, active monitoring and related tests can only be executed from a limited number of dedicated service end points and are therefore difficult to be automated.

Further, a statistical analysis of a large amount of measurement data captured network-wide, e.g., by using many mobile stations involving many base stations, is very expensive and time-consuming and actually infeasible in view of complexity of mobile communication environments installed in the field.

Another option would be to attach a protocol tester to a network interface, e.g., the Gb-, the Gi- or the Gn-interface, and to capture data packets seen at that point in the communication network.

Also, in Kim P. et al., "IMS-based Push-to-Talk over GPRS/UMTS", Wireless Communications and Networking Conference, 2005, IEEE New Orleans, La., USA, 13-17 Mar. 2005, Piscataway, N.J., USA, IEEE, 13 Mar. 2005, pages 2472-2477, XP010791564, ISBN: 0-7803-8966-2, there is reported the design of a Push-to-Talk operated over a GPRS/ UMTS network, so-called Push-to-Talk over Cellular-PoC. There was built a service based on 3GPP IP Multimedia Subsystem IMS to verify the overall PoC approach through an implementation, to discuss design details and to measure results achieved in a live network based on existing GPRS access technology.

Also, in US 2003/0,212,778 A1, there is described an object-oriented modelling approach being used to represent telecommunication services, parameters, and calculation expressions associated with the parameters. Preferably, the Unified Modelling Language UML is used in this regard, and UML sequence diagrams are used to represent the calculation expressions as a sequence of UML methods that accomplishes what is required by the expression.

Nevertheless, the following difficulties arise during analysis of related network interface data, e.g.:

The session initiating protocol SIP messages may be compressed using, e.g., the Sigcomp protocol. Therefore, related messages may contain state information associated with a push-to-talk session, which implies that the contents of individual session initiating protocol SIP messages are impossible to interpret without tracking previous protocol states.

Important end-to-end performance measures cannot be found directly in protocol data fields, except for voice quality in a downlink direction, where jitter and data loss is available. Also, end-to-end performances require searching corresponding events and related data packets on the basis of complex data packet filters.

Further to the above, there exist performance counters implemented in network nodes which can be used to trace performance problems. However, some of these counters are not dedicated for specific services, but rather for the GSM/ GPRS or the UMTS system in general. While there are service related counters in network nodes of post, telephone, telegraph networks, these counters measure only low-level protocol interactions.

Having regard to the application of counters, also here several problems arise as well:

System-specific counters provide rather limited types of statistics, e.g., on the number of data packets or number of subscriber sessions and related packet data protocol contexts arriving in a unit time. Also, system-specific counters can hardly be bound to post, telephone, telegraph services.

Service-specific counters provide basic performance information on aggregate basis, e.g., SIP response time on the basis of a request and a type of a response. Counters do not support detailed performance analysis involving the identification of push-to-talk sessions and corresponding subscribers.

Different vendors implement different counters, log file formats and mechanisms to download from the networking nodes, which makes it ineffective to build an on-line coherent performance monitoring system in a multi-vendor environment. Also, the node resources to this purpose would be limited. In other words, generally significant hardware/software resources would be needed for measuring different performance indicators, increasing the costs of networking elements. Also, a consequence of the resource limitations for counter-based performance analysis schemes is that the time-resolution of these counters is coarse.

In view of the above, existing solutions do not provide an answer to important questions which arise to network operators:

Were the call-control and the floor-control functions operating fast enough for subscriber satisfaction?

Was the voice quality of successful push-to-talk sessions satisfactory?

Was it possible to identify subscribers, groups of subscribers or network regions in a case where performance problems occurred?

SUMMARY OF INVENTION

In view of the above, the object of the present invention is to provide a solution for efficient and large-scale characterization of push-to-talk service performance in a mobile communication environment.

According to the present invention, this object is achieved by a method of passive evaluation of push-to-talk traffic in a communication network. It is assumed that push-to-talk traffic is generated through at least one push-to-talk session dividing into a plurality of data transactions according to different traffic classes. A first traffic class covers interactions between a user terminal and the communication network for log-on of user terminals to the communication network, a second traffic class covers interactions between a user terminal and a push-to-talk management node in the communication network for push-to-talk session initialisation, and a third traffic class covers exchange of push-to-talk payload data among user terminals.

The inventive method comprising the steps capturing data transactions in the communication network, extracting interpretations of data transactions being relevant for push-to-talk, traffic classes, and users, from captured data transactions, storing a correlation of extracted interpretations of data transactions being relevant for push-to-talk, traffic classes, and users in a traffic data base, and calculating at least one performance indicator with respect to at least one selected push-to-talk session as a function of information stored in the traffic database.

One important advantage of the present invention is that it is not actively addressing dedicated end users, but it is passive in the sense that it relies on capturing data transactions at specific points in the push-to-talk communication environment. For the first time it is possible to apply, per subscriber, passive survey of push-to-talk services without service interference in mobile communication.

The present invention large scale push to talk service analysis by storing information generated by capturing data transactions in a structured and correlated way. This forms the basis for reconstructing push-to-talk traffic falling in different traffic classes and therefore to develop a global view on overall push-to-talk system performance.

In other words, the present invention provides a large scale analysis tool specific to push-to-talk services for the operators to judge whether push-to-talk services operate well in their communication environment.

Further, it is possible to pinpoint roots of performance problems through application of the passive monitoring according to the present invention.

Using the passive monitoring method according to the present invention, it becomes possible to execute online, multitudinous measurements of push-to-talk communication sessions. The usage of push-to-talk services is analysed through push-to-talk performance indicators. The analysis result allows to pinpoint user perceived performance and, if occurring, mobile communication networking problems.

According to large scale analysis of push-to-talk traffic, the present invention may be applied at a single standard interface in the communication network. E.g., without limiting the scope of the present invention, the method according to the present invention may be operated at the Gi-interface of a GPRS/EGPRS generic packet radio service mobile communication network. Generally, any interface that is service-specific and works on all protocol elements involved in creating the push-to-talk service is appropriate for application of the inventive method. Preferably, the interface would be independent of the underlying mobile networking system, e.g., GPRS or UMTS, to build a coherent performance monitoring system in a multi-vendor mobile communication network.

Further, according to the present invention, the large scale analysis of push-to-talk traffic in a communication network basically divides into receipt of data transactions the de-multiplexing thereof, subsequent interpretation of data transactions and related of data packets exchanged for, e.g., establishment of a packet data protocol context, for session initialization, for group management, for transfer of payload data, etc., subsequent storage of generated analysis results in a data base, and calculation of performance indicators through query of the generated data basis. Preferably, part of the information generated during analysis of data packets may be fed back to the de-multiplexer for efficient de-multiplexing of data packets.

In more detail, the different types of data transactions are related to establishment of a data packet context according to a data packet context protocol. Here, the analysis may generate a relation between an identity of an active user and a related communication address. This information may not only be stored in the database but also fed back to the de-multiplexer for de-multiplexing of a receipt flow of data packets. Further information for storage in the database may be related to data packet context parameters.

A further step of analysis of captured data transactions is related to initialization of active users participating in a push-to-talk session according to a session initialization and a session description protocol. Here, preferably assuming that compression takes place for related data packets, according to the present invention there may also be executed a step of de-compressing data packets exchanged for execution of initialization of active users before subsequent analysis thereof. Such information may describe communication ports, e.g., IP ports, which are used for exchange of information according to a payload data transfer protocol and a related transfer control protocol, e.g., RTP and/or RTCP, further identification of initiated sessions and identification of called active users. Similar information may also be stored in the traffic data base.

Further, another type of analysis of data transactions may related to the control of transfer of push-to-talk session payload data according to a related transfer control protocol, e.g., RTCP.

Further, another type of analysis of data transactions may be related data transfer protocol, e.g., RTP, for reconstruction of related payload data bursts.

Further, another type of analysis data transactions may be related to group management and access control according to a control information data transfer protocol, e.g., HTTP.

Further preferred embodiments of the present invention relate to the calculation of performance indicators.

According to a preferred embodiment of the present invention, performance indicators are defined with respect to different types of traffic classes defined for data exchange during a push-to-talk session. In other words, performance indicators are defined for characteristics of establishment of a data packet context, for initialization of a push-to-talk session, for group management and access control characteristics, for payload data exchange, and for control of payload data exchange.

It is according to these traffic class specific performance indicators that the present invention allows for a very detailed and accurate way of push-to-talk session analysis in a communication network and for related pinpointing to specific problems, if necessary.

According to a preferred embodiment, it is suggested to filter relevant information during calculation of performance indicators to focus on a subset of push-to-talk sessions and/or active users.

Also, the present invention is not restricted to any particular type of evaluation of performance data stored in the traffic data base. Any useful performance estimation may be applied to the stored push-to-talk session characteristics for delivery of key performance indicators proving to be of highest usefulness when analyzing push-to-talk sessions.

Using the method according to the present invention, it is possible to obtain close estimations of true performance indication measured at, e.g., an end point such as, e.g., a 'push-to-talk call setup success indicator', an 'initial push-to-talk time', a 'subsequent push-to-talk time', and an 'initial buffering time'. Also, speech quality can be evaluated through appropriate definition of performance indicators.

According to the present invention there is provided a computer program product directly loadable into the internal memory of a monitoring apparatus for passive monitoring of push-to-talk traffic in a mobile communication environment comprising software code portions for performing the inventive passive monitoring process when the product is run on a processor of the monitoring apparatus.

Therefore, the present invention is also provided to achieve an implementation of the inventive method steps on computer or processor systems. In conclusion, such implementation leads to the provision of computer program products for use with a computer system or more specifically a processor comprised in e.g., a monitoring apparatus for passive monitoring of push-to-talk traffic in a mobile communication environment.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or the Internet and/or telephone networks via modems or other interface devices. It should be understood that such media, when carrying processor readable instructions implementing the inventive concept represent alternate embodiments of the present invention.

BRIEF DESCRIPTION OF THE DRAWING

In the following, the best mode and preferred embodiments of the present invention will be described with reference to the drawing, in which.

DESCRIPTION OF BEST MODE AND PREFERRED EMBODIMENTS

Figure 1:
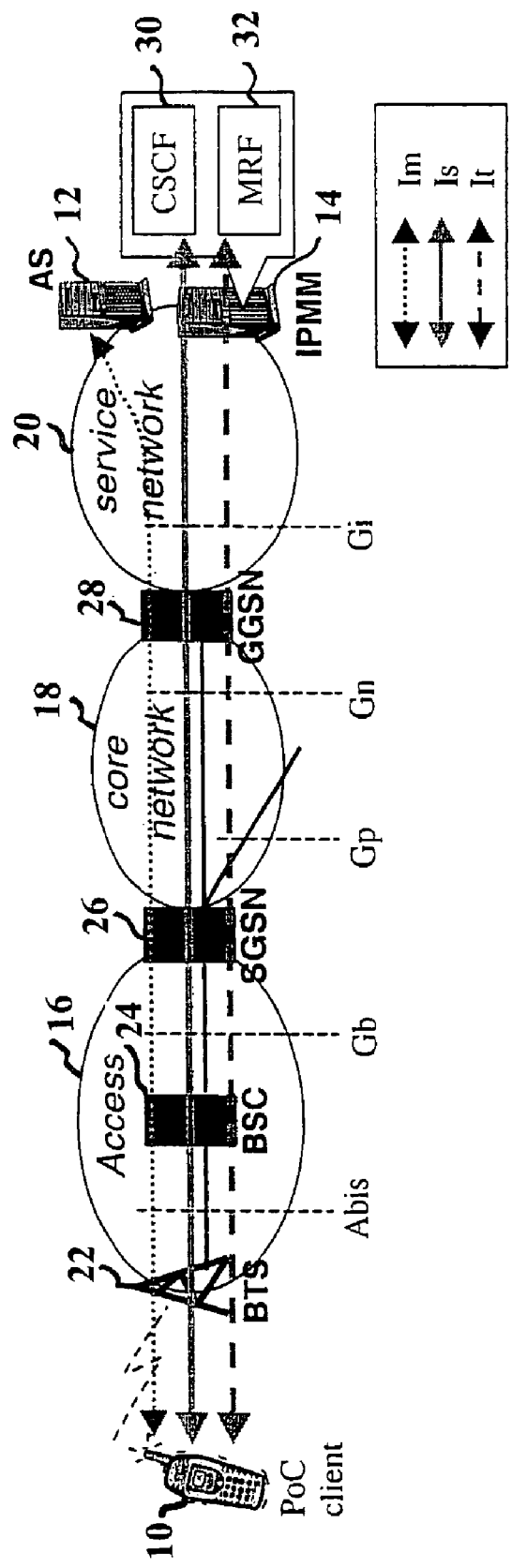
FIG. 1 shows an architecture of a push-to-talk service providing system on top of a GPRS mobile communication network.

In the following, the best mode of the present invention and preferred embodiments thereof will be described with reference to the drawing. Here, it should be noted that the different aspects and related functionality according to the present invention may be implemented either in software and/or hardware and/or a combination thereof. Also, insofar as different units are shown in the figures, it is to be understood that any such unit may be implemented using dedicated hardware or general purpose hardware configured appropriate, e.g., DSP processors, microcomputers, related memories, etc. As any such components are commonly known to the person skilled in the art, any detailed explanation thereof will be omitted.

Further, as FIG. 1 shows the architecture of a push-to-talk service architecture on top of a GPRS mobile communication network, the explanations given above also apply to the following disclosure of the present invention, e.g., according to the network architecture, the involved functional entities, the different layers of signalling, the different interfaces, and the protocols explained with respect to push-to-talk service delivery.

Further, it should be noted that the application of the inventive large scale analysis of push-to-talk service delivery and the installation of the related monitoring apparatus may be at any single point of a mobile communication network, e.g., the GPRS mobile communication network shown in FIG. 1.

However, the application of the present invention is not restricted to a particular type of mobile communication environment and any bearer technology, e.g., UMTS under any standard like 3GPP, cdma 2000, IMT 2000, or any type of wireline network supporting push-to-talk services etc., is well applicable to the present invention.

Insofar as a specific point for attachment and application of the present invention is considered, it is preferable to select a point that works on all protocol elements involved in creating and executing a push-to-talk service, e.g., the Gi-interface shown in FIG. 1.

As will become clear from the following specification, irrespective of the type of underlying communication network and protocol stack used for delivery of push-to-talk services, the present invention enables building a coherent performance monitoring system in a multi-vendor mobile communication network.

Further, the following specification will show that the present invention applies large analysis of push-to-talk services in a passive manner. This implies non-intrusive monitoring of ongoing processes without interference or disturbance of network operation.

Basically, without restricting scope of the present invention, one may categorize data transactions initiated for push-to-talk traffic into different traffic classes:

1. A first traffic class covers interactions between a user terminal and the communication network for log-on of user terminals to the communication network. An example of corresponding protocol would the packet data protocol.
2. A second traffic covers interactions between a user terminal and a push-to-talk management node, e.g., the application server 12 shown in FIG. 1, in the communication network for push-to-talk session initialisation. Typical example of related protocol are the session initialisation protocol SIP and the session description protocol SDP.
3. A third traffic class covers exchange of push-to-talk payload data among user terminals, which may be achieved, e.g., according to the Real-time Protocol. Also falling in the third traffic class are data transactions for payload data transfer control. Here, an example of a related protocol is the Real-Time Control Protocol.
4. A fourth traffic class covers interactions between a group management node in the communication network and user terminals for group management and access control, which may be achieved, e.g., according to the Hypertext Transfer Protocol and through support of a group list management Server GLMS.

In view the above, in the following the best mode and preferred embodiments of the present invention will be described in detail.

Figure 2:
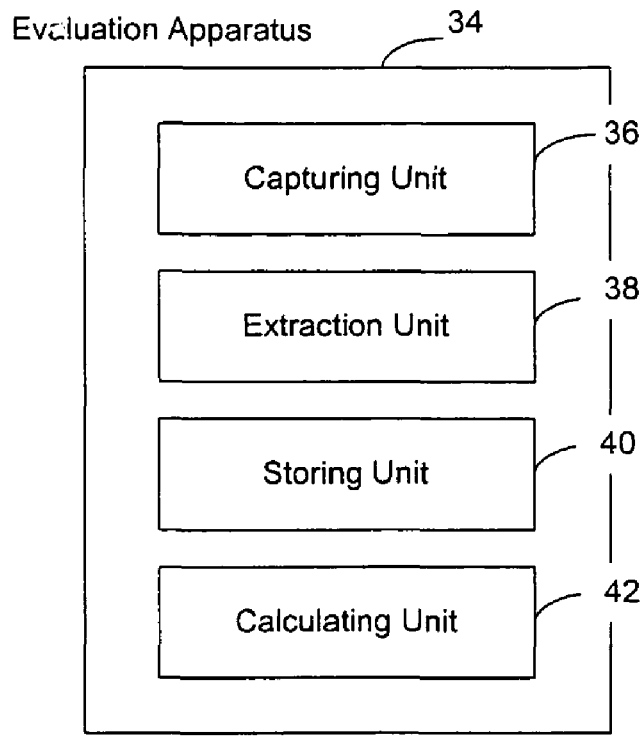
FIG. 2 shows a schematic diagram of an evaluation apparatus for large scale analysis of push-to-talk traffic in a mobile communication environment.

FIG. 2 shows a schematic diagram of an evaluation apparatus 34 provided for large scale analysis of push-to-talk traffic in a mobile communication environment.

As shown in FIG. 2, the evaluation apparatus 34 comprises a capturing unit 38, an extraction unit 38, a storing unit 40, and a calculating unit 42. The different sub-unit of the evaluation apparatus may communicate mutually and are operated under control of a controller (not shown in FIG. 2).

Figure 3:
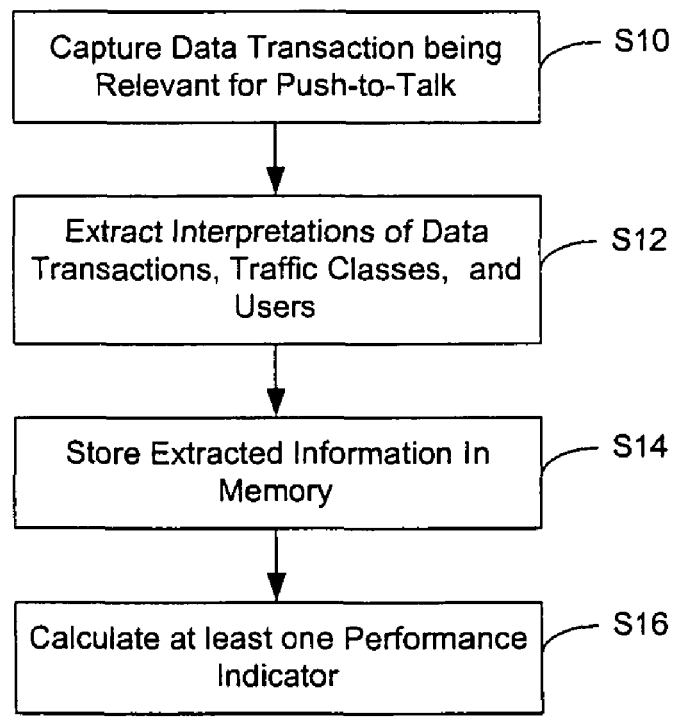
FIG. 3 shows a flowchart of operation of the evaluation apparatus shown in FIG. 2.

FIG. 3 shows a flowchart of operation for the monitoring apparatus 34 shown in FIG. 2.

As shown in FIG. 3, operatively the capturing unit 36 executes a step S10 to capture data transactions in the communication network. These data transaction should be relevant to push-to-talk and can be executed, e.g., a standardized interface in an operational mobile communication network, e.g., GPRS/UMTS.

As shown in FIG. 3, operatively the extraction unit 38 executes a step S12 to at least extract interpretations of data transactions being relevant for push-to-talk, traffic classes, and users, from captured data transactions. Typically, this step S12 serves as pre-requisite to express and correlate all the information which is needed to re-construct push-to-talk sessions, including voice talk, burst, floor-control, and administrative requests. It also serves to build a traffic data base where adequate information about each push-to-talk session and voice burst is stored for later performance indicator processing.

As shown in FIG. 3, operatively the storing unit 40 executes a step S14 to store a correlation of extracted interpretations of data transactions being relevant for push-to-talk, traffic classes, and users in a traffic data base.

As shown in FIG. 3, operatively the calculating unit 40 executes a step S16 to calculate at least one performance indicator with respect to at least one selected push-to-talk session as a function of information stored in the traffic database. Here, the function to be evaluated for derivation of performance indicators is freely configurable within the framework of the present invention, e.g., maybe any type of statistical function or pre-established relation between performance indicator and related measurement data.

Figure 4:
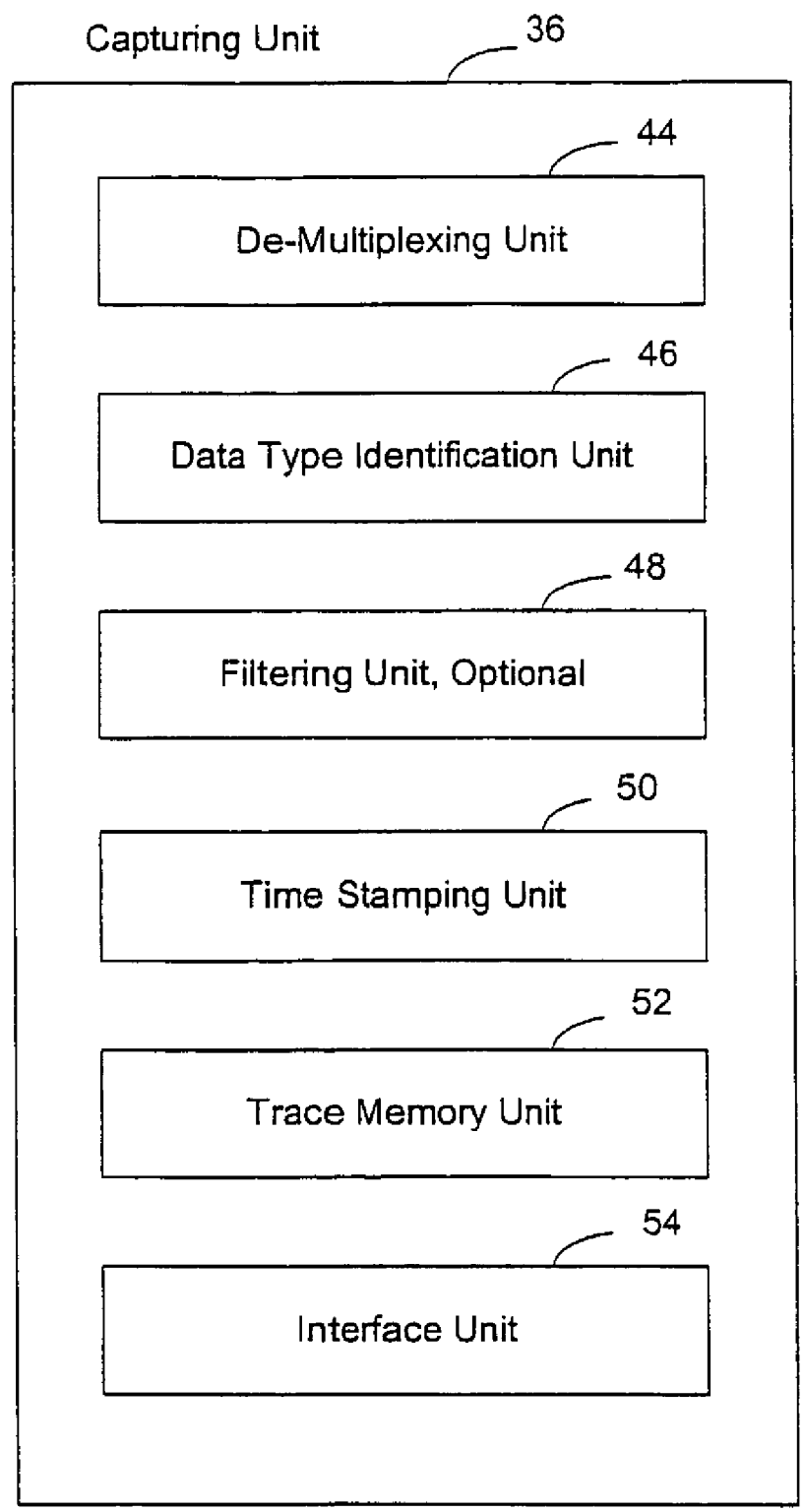
FIG. 4 shows a detailed schematic diagram of the capturing unit shown in FIG. 2.

FIG. 4 shows a detailed schematic diagram of the capturing unit 38 shown in FIG. 2.

As shown in FIG. 4, the capturing unit 38 comprises a de-multiplexing unit 44, a data packet type identification unit 46, optionally, a filtering unit 48, a time-stamping unit 50, a trace memory unit 52, and an interface unit 54.

Figure 5:
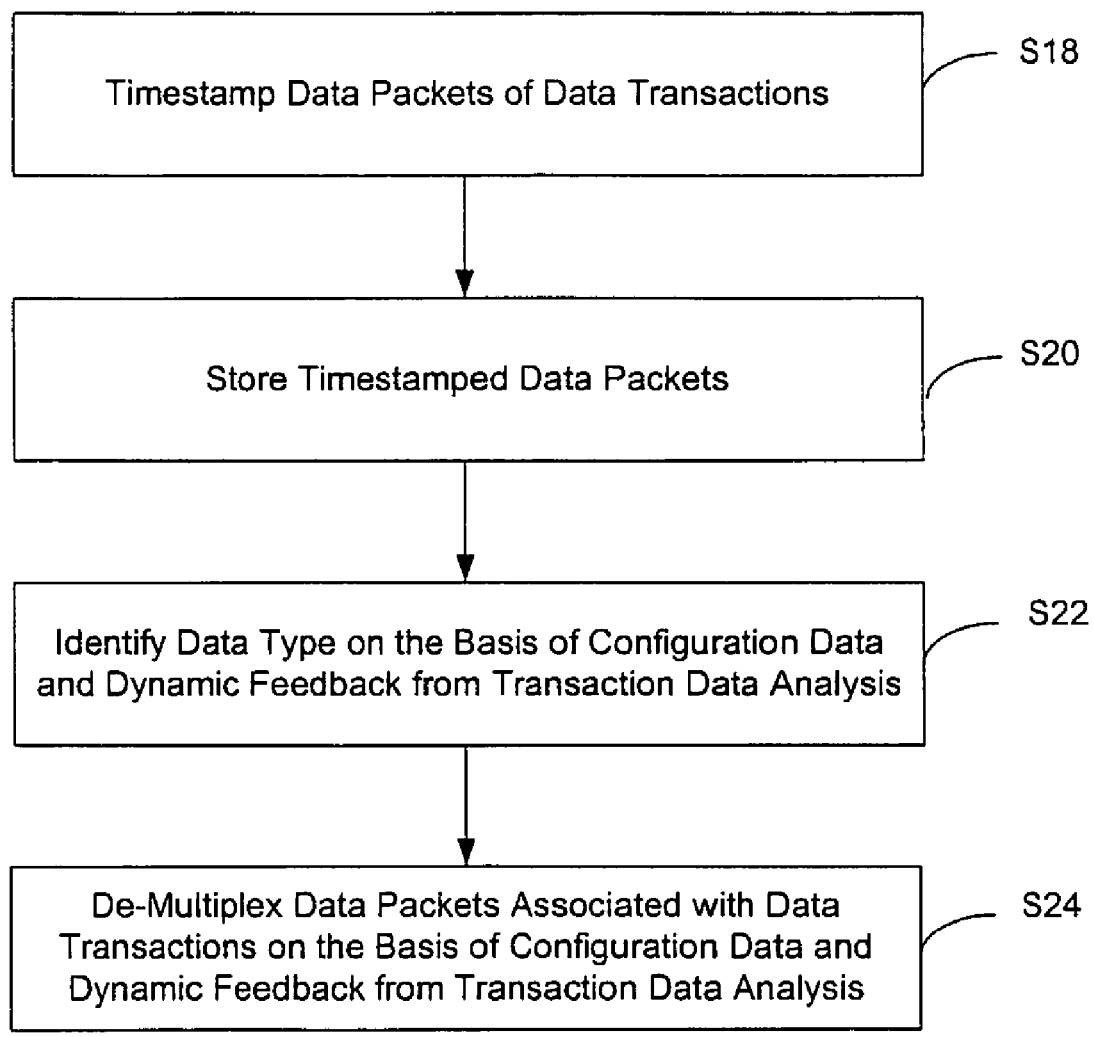
FIG. 5 shows a flowchart of operation for the capturing unit shown in FIG. 4.

FIG. 5 shows a flowchart of operation of the capturing unit 38 shown in FIG. 4.

As shown in FIG. 3, operatively the time stamping unit 50 executes a step S18 to time-stamp data packets exchanged during data transactions. Due to the time-stamping of de-multiplexed data packets, it is possible to pass through the trace memory unit 52 in order to re-construct different sub-sessions during a push-to-talk session.

As shown in FIG. 3, operatively the trace memory unit 52 executes a step S20 to buffer time-stamped data packets.

As shown in FIG. 3, operatively the data type identification unit 46 executes a step S22 to identify the types of data packets. Here, the data type identification unit 46 is adapted to recognize data packet types dynamically on the basis of feedback from data transaction analysis, as will be explained in more detail in the following.

E.g., data types may be identified by the relevant protocol types, communication addresses and communication port numbers, etc. By considering command sequences, call identification fields of, e.g., session initialisation protocol SIP messages and related data packets, the data packet type identification unit 46 is also operable to decide which push-to-talk session a data packet belongs to. This triggers the forwarding of data packets to appropriate analysis units of the evaluation unit 38 shown in FIG. 2.

As shown in FIG. 3, operatively the de-multiplexing unit 44 executes a step S24 to de-multiplex data packets associated with the data transactions. Here, de-multiplexing is executed in step S24 on the basis of data packets time stamped by the time stamping unit 50 and buffered in the trace memory unit 52.

Further, as some information needed to handle the traffic trace cannot be obtained from the traffic trace or equivalent flow of data packets itself, it will be specified as configuration information, which may change over time, to the de-multiplexing unit 44 and forwarded via the interface unit 54.

Figure 6:
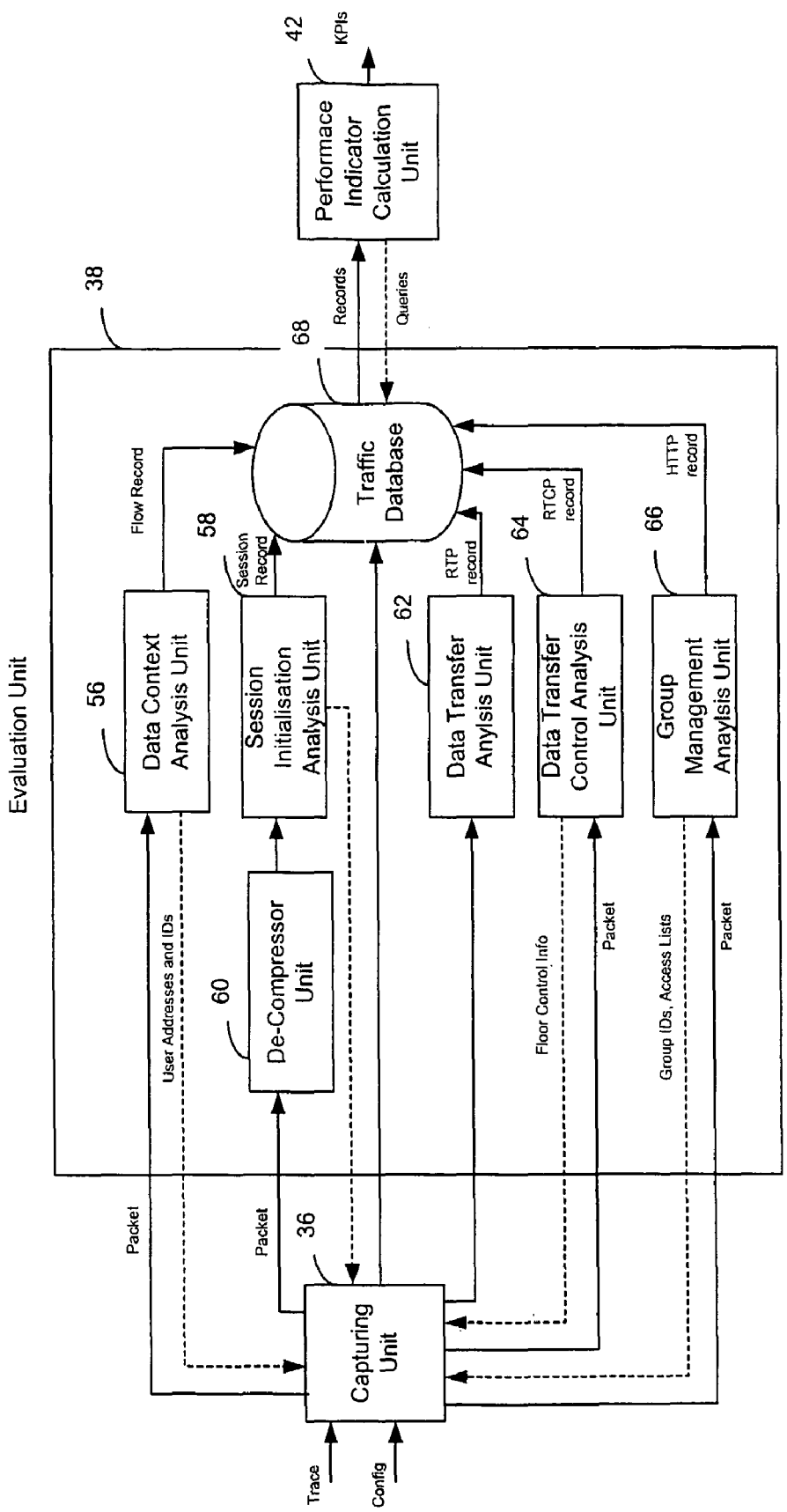
FIG. 6 shows a detailed schematic diagram for the evaluation unit shown in FIG. 2.

FIG. 6 shows a detailed schematic diagram of the evaluation unit 40 shown in FIG. 2.

As shown in FIG. 6, the evaluation unit 38 comprises a data context analysis unit 56 and a session initialisation analysis unit 58 which is supplied with data through a de-compressor unit 60. Further, the evaluation unit 38 comprises a data transfer unit 62, a data transfer control analysis unit 64, a group management analysis unit 66, and a traffic database 68 corresponding to the storing unit shown in FIG. 2. Further the communication flow between the different sub-units of the evaluation unit 38 and external components, e.g., the capturing unit 36 and the calculating unit 42 is shown with solid and dashed line arrows in FIG. 6.

It can be seen that the evaluation unit 38 divides into a plurality of different analysis units adapted to the analysis of specific sub-sessions of a push-to-talk session, firstly, for appropriate delivery of analysis records to the traffic data base 68, and, secondly, for feedback of appropriate configuration data to the capturing unit 36, in particular the de-multiplexing unit comprised.

Also, while according to FIG. 6 the evaluation unit 38 is described as comprising a traffic data base 68, it should be noted that this traffic data base 68 may also be provided either separately as stand-alone unit in the communication environment or in combination with any other unit described with respect to the present invention. Therefore, the configuration shown in FIG. 6 is to be understood as being an example and not as limiting the scope of the present invention.

Figure 7:
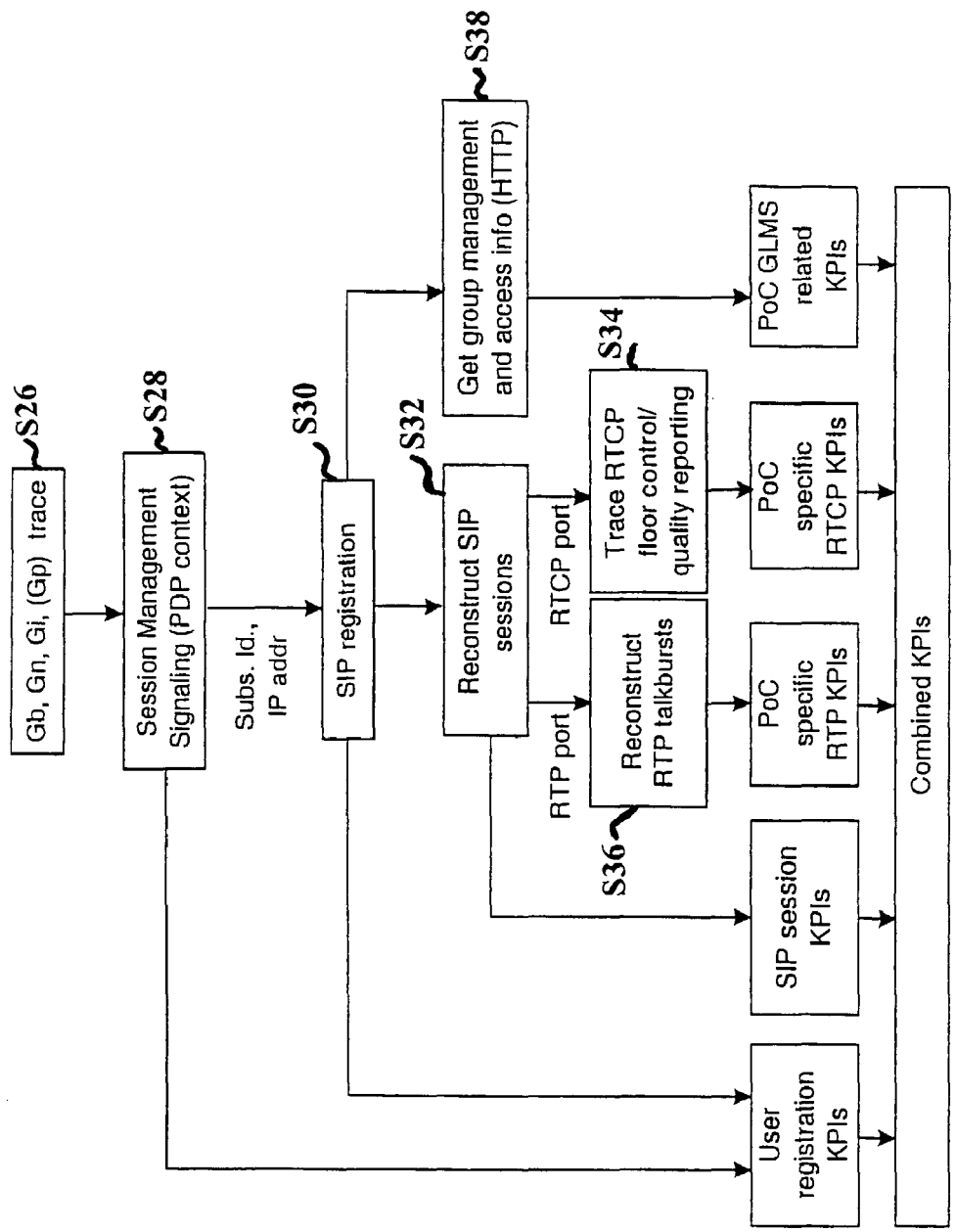
FIG. 7 shows a flowchart of operation for the evaluation unit shown in FIG. 6.

FIG. 7 shows a flowchart of operation of the evaluation unit 38 shown in FIG. 6.

As shown in FIG. 7, after deciding the interface to be traced in step S26, operatively the data context analysis unit 56 executes a step S28 to analyse control packets exchanged with data transactions establishing a data packet context according to a data packet context protocol, e.g., PDP or PPP, to identify communication addresses of new active users.

As shown in FIG. 6, operatively the data context analysis unit 56 also executes a step of feeding back a relation between an analysed communication addresses and a related active user identifications to the capturing unit 36 for de-multiplexing of data packets.

As shown in FIG. 6, operatively the data context analysis unit 56 also executes step of forwarding a data packet context record or equivalently a flow record to the traffic database 68.

Here, the data packet context record contains information reflecting the correlation between the analysis of data packets exchanged for establishing a data packet context and the indication of the first traffic class. Further, traffic characteristics of the first traffic class cover active user identification, communication address, and/or data packet context parameters QoS, as example.

In more detail, the data context analysis unit 56 may be adapted to interpret the packet data protocol PDP context establishment procedure by analysing a layer 3 session management to find one or more users that established a packet data context. Also, the data context analysis unit 56 may be adapted to identify communication addresses, e.g., IP addresses, and subscriber Ids, e.g., IMSI values, for newly appearing active users who wish to use a push-to-talk service. Then, data context analysis unit 56 may feedback a pair {subscriber ID, communication address} to the capturing unit 36. Also, the data packet context record may contain information like subscriber ID, communication IP address, or any other appropriate type of PDP context parameters, etc. Generally, any information that may be used in support of calculation of performance indicators may be forwarded from the data context analysis unit 56 to the traffic data base 68.

As shown in FIG. 7, operatively the session initialisation analysis unit 56 executes a step S30 to analyse data packets exchanged with data transactions for execution of an initialisation of active users participating in a push-to-talk session according to a session initialisation and a session description protocol. Also, the session initialisation analysis unit 56 may execute a step S32 to reconstruct session initialisation sessions to generate information necessary to analyse data transfer and data transfer control, as will be explained in more detail in the following.

In more detail, the session initialisation analysis unit 56 may be adapted to analyse data packet exchange for execution of an initialisation of active users participating in a push-to-talk session according to a session initialisation protocol SIP and a session description protocol SDP, as examples of related protocols.

Here, session initialisation sessions may be uniquely identified using user communication/IP addresses and call-ID protocol header fields, which are carried in each session initialisation SIP packet. As the start of session initialisation calls, which under the SIP protocol are detected by so-called SIP INVITE messages, the related session description SIP packets describe port numbers that the corresponding transfer protocol RTP and transfer control protocol RTCP data packets will use. Related RTP talk bursts, RTCP floor-control signalling transactions, and RTCP quality reports within the session initialisation can then be re-constructed.

As shown in FIG. 6, operatively the session initialisation analysis unit 56 also executes a step of feeding back information for de-multiplexing of data packets. The information describes communication ports used for exchange of information according to a session payload data transfer protocol (RTP) and/or a session payload data transfer control protocol (RTCP), identification of initiated sessions, and/or identification of called active users.

As shown in FIG. 6, operatively the session initialisation analysis unit 56 also executes a step of forwarding a session record to the traffic database. The session record contains information reflecting the correlation between push-to-talk session identification, the analysis of data packets exchanged for execution of initialisation of active users participating in a push-to-talk session, and the indication of the second traffic class.

In more detail, the session record may contain information describing communication ports under a transfer protocol and a transfer control protocol, e.g., RTP and/or RTCP, further session initialisation identifications, e.g., SIP session IDs, and/or called party identifications. In conclusion, the session initialisation analysis unit 56 may re-constructs SIP registration and SIP sessions to provide RTP and RTCP port numbers used within SIP sessions for transmitting RTP talk bursts and related RTCP control messages. Also, other identifiers, e.g., command sequences, call identifications, identification of called users, etc., may be processed. Based on identified session parameters, the session record is then created for storage in the traffic data base 68.

In the following, details of de-compression executed with respect to session initialisation analysis will be explained.

As shown in FIG. 6, operatively the de-compression unit 60 supplying data to the session initialisation analysis unit 56 executes a step to de-compress data packets exchanged with data transactions for executing initialisation of active users. According to the present invention it is suggested to maintain an aggregated state memory for decompression such that the states of all data transactions in the second traffic class are represented. Also, the de-compression unit 60 is adapted to manage the aggregated state memory such that states may be deleted automatically.

In more detail, e.g., in push-to-talk over cellular, human readable session initialisation and description protocols, e.g., SIP/SCP, are used to set up a push-to-talk connection which, however, is based of precious radio resources. Therefore, there is an option to compress session initialisation and description communication, e.g., according to the signalling compression protocol SigComp, defined by RFC 3320 and RFC 3321, included herein by reference.

From the aspect of large scale push-to-talk analysis, the drawback of using compression is that a compressed message may not be de-compressed without knowing states that have been saved at earlier stages of the communication session.

In view of this, signalling compression is offered to applications as a layer between the application and an underlying transport, such as a message or stream based on, e.g., universal transcription protocol UTP or transfer control protocol TCP, respectively. The service provided by the signalling compression layer is that of the underlying transport. It should be noted that the compression/de-compression process is entirely controlled by the sending entity.

Heretofore, a so-called binary de-compressor byte code that may be executed on a so-called universal de-compressor virtual machine UDVM, much like, e.g., a Java Virtual Machine, but designed solely for the purpose of running de-compressor byte codes, is sent using a signalling compression message. Then, de-compression is executed in a self-abstraction manner without the need to know anything of the sending entity and vice versa.

When de-compressing a message and related data packets, the universal de-compressor virtual machine UDVM may have access to a memory that stores states, the byte code and, e.g., a dictionary to refer to matched strings, see, e.g., Jan Christoffersson: LZBS—a compression algorithm for Sig-Comp, and DEFLATE Compressed Data Format Specification version 1.3, RFC 1951.

Here, according to the present invention matched strings are saved as aggregated states that can be used in subsequent compression/de-compression processes. The dictionary is usually a part that covers the whole of the memory, e.g., a circular buffer as described in Implementer's Guide for Sig-Comp, draft-ietf-rohc-sigcomp-implementer-guide-00.txt, where the signalling compression message is decompressed. The memory therefore contains a mixture of current and previous application messages and static dictionaries, as described in, e.g., The Session Initiation Protocol (SIP) and Session Description Protocol—(SDP) Static Dictionary for Signaling Compression (SigComp), RFC 3485.

During signalling compression and de-compression, the request created in pre-state operations are performed only after successfully de-compressing the entire message only if the application running on top of the signalling compression accepts a de-compressed message. This acceptance mechanism is application-specific and not to be discussed with respect to signalling compression.

In the signalling de-compressor unit 60 shown in FIG. 6, instead of separating sessions via different compartments, all states may be saved in an aggregated state memory. Therefore, opening and closing conditions are push-to-talk sessions that in case of push-to-talk over cellular require signalling initialisation protocol SIP parsing may be discarded. In addition, there is no need to keep track of optional advertisement of parameters, either.

In more detail, the de-compressing unit 62 shown in FIG. 6 is adapted to achieve signalling de-compression according to the following procedure:

1. Identify SigComp messages, where SigComp messages start with the part 11111xxx.
2. De-compress a universal de-compressor virtual machine UDVM instance.
3. If de-compression fails, return with an error. Here, de-compression failure may occur for a number of reasons, e.g., attempting to access a state that does not exist, invalid UDVM instruction code, addressing beyond memory available for de-compression, exceeding the available cycles per bit, etc., according to IETF RFC 3320 referred to above.
4. Create and free states that were requested by the de-compressor byte code. Here, a conceptual state handler, e.g., as outlined in RFC 3320, does not need to exist in the de-compressor module 62. All states are seen by all push-to-talk sessions, and states not used for a rather long period of time are deleted automatically, if the state memory gets too large. Further, there are protected states, e.g., those that describe a session initialisation/description dictionary, which are never deleted during operation.

5. Create shared state, if advertised. Here, a compressor may create a shared state from the uncompressed message and offer it to the communicating peer end point for use during compression. This is indicated by sending the shared state identifier in the parameter block of the signalling compression message, see, e.g., RFC 3321.

6. Return decompressed message.

Further to the details of de-compression executed with respect to session initialisation analysis as explained above, the following explanations are directed towards additional analysis steps with respect to data transfer, data transfer control, and group management.

As shown in FIG. 7, operatively the data transfer control analysis unit 64 executes a step S34 to analyse data packets exchanged with data transaction for control of transfer of push-to-talk session payload data and/or for quality reporting according to a session payload data transfer control protocol.

In more detail, the data transfer control analysis unit 64 may receive RTCP packets. The related information is floor-control information and quality indication, wherein floor-control is, e.g., used to control who speaks and who listens. Further, the control session information is related to quality indication reports or, in other words, receiver reports, and further some statistics of payload data packets measured by a receiver, such as number of data packets, lost data packets, etc.

As shown in FIG. 6, operatively the data transfer control analysis unit 64 also executes a step of feeding back information for de-multiplexing of data packets, wherein the information describes control of transfer of push-to-talk session payload data.

As shown in FIG. 6, operatively the data transfer control analysis unit 64 also executes step of forwarding a payload data transfer control record to the traffic database 68. The payload data transfer control record reflects the correlation between the related push-to-talk session identification, the analysis of data packets exchanged for control of transfer of push-to-talk session payload data and/or for quality reporting, the identification of corresponding payload data transactions of the same user, and a reference to payload and control data of further participants of the same push-to-talk session.

As shown in FIG. 7, operatively the data transfer analysis unit 62 executes a step S36 to analysing data packets exchanged with data transactions according to a session payload data transfer protocol during transfer of push-to-talk session payload data for reconstruction of related payload data bursts.

In more detail, the data transfer analysis unit 62 may be adapted to analyse data packets exchanged as payload data according to a specific transfer protocol, e.g., RTP. Then, from reconstructed talks there may be derived information that describes, e.g., the size and duration of a talk burst and/or the perceived loss and jitter.

As shown in FIG. 6, operatively the data transfer control analysis unit 64 also executes step of forwarding a payload data transfer record to the traffic database ( ). The payload data transfer record reflects the correlation between the related push-to-talk session identification, the analysis of data packets exchanged for transfer of push-to-talk session payload data, the identification of corresponding control data transactions, and a reference to payload and control data of further participants of the same push-to-talk session.

As shown in FIG. 7, operatively the group management analysis unit 66 executes a step S38 for analysing data packets exchanged with data transactions for group management and access control according to a control information data transfer protocol.

In more detail, the group management analysis unit 66 may be adapted to analyse data packets exchanged for group management and access control according to a related data transfer protocol, e.g., HTTP, for extraction of group management and access control information.

As shown in FIG. 7, typically, user management and access control is executed immediately after session initialisation using a specific communication, e.g., being HTTP-based, where group management and access control information is retrieved to a push-to-talk session participants. Any time later, upon a user's request, this control information may then by modified.

As shown in FIG. 6, operatively the group management analysis unit 66 also executes a step of feeding back information for de-multiplexing of data packets, wherein the information describes user group identifications and/or access lists.

As shown in FIG. 6, operatively the group management control analysis unit 66 also executes step of forwarding a session management record to the traffic database, wherein the session management record reflects the correlation between push-to-talk session identification and the analysis of data packets exchanged for group management and access control.

In the following further details of performance indicator calculation will be explained.

As shown in FIG. 7, according to the present invention performance indicators may be calculated either with respect to specific types of data transactions relevant for push-to-talk or in a combined manner.

E.g., performance indicators may be defined for data traffic establishing a data packet context according to a data packet context protocol, for data traffic for executing an initialisation for active users participating in the push-to-talk session according to a session initialisation and a session description protocol, for data traffic exchanged for forwarding group management and access control information to active users according to a control information data transfer protocol, for data traffic exchanged for transfer of push-to-talk payload data according to a session payload data transfer protocol according to the third traffic class, and/or for data traffic exchanged for control of push-to-talk payload data transfer according to a payload data transfer control protocol.

Figure 8:
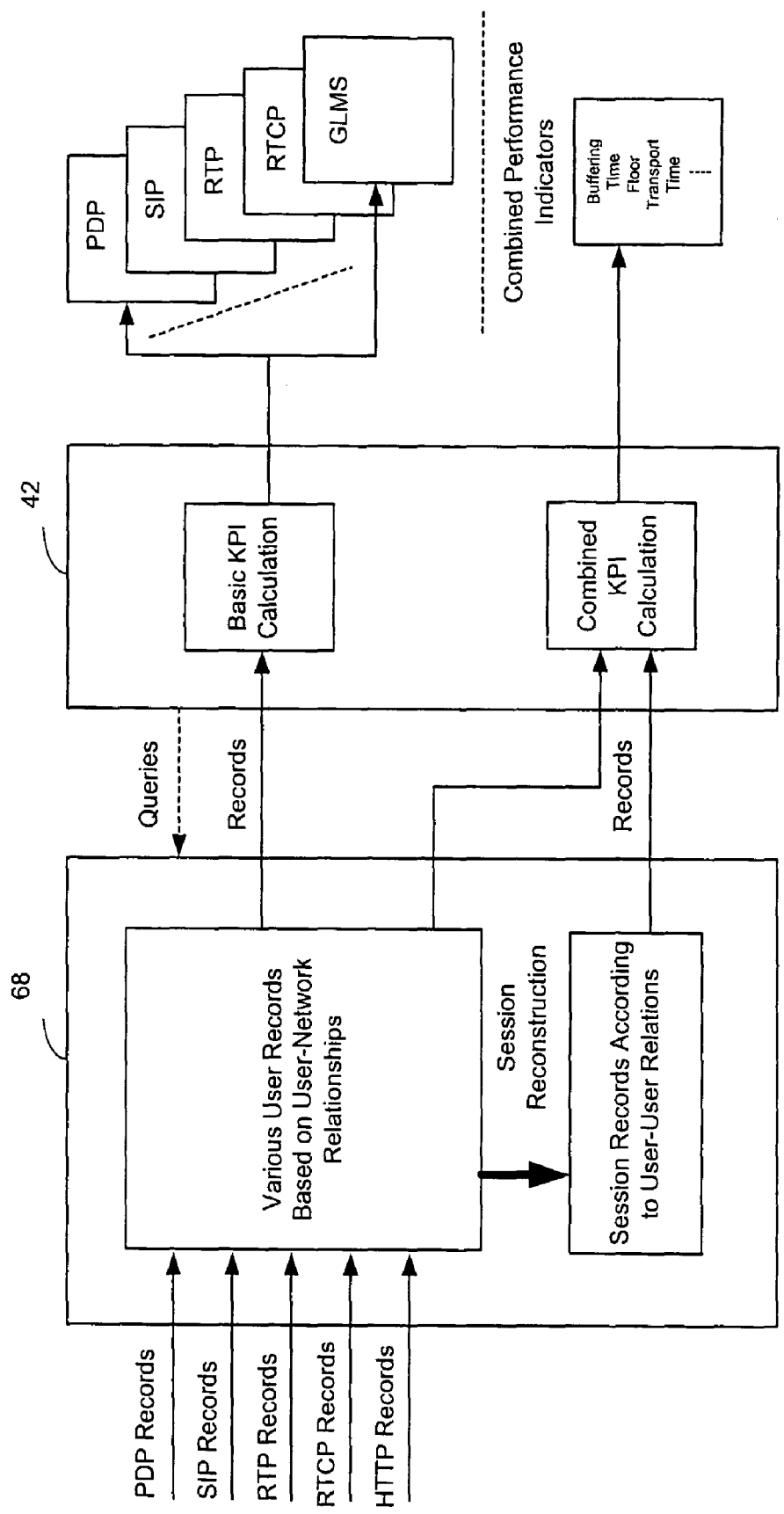
FIG. 8 shows a schematic diagram of the traffic database structure used in the traffic data base shown in FIG. 6.

FIG. 8 shows a schematic diagram of the traffic database structure used in the traffic data base shown in FIG. 6.

As shown in FIG. 8, the traffic data base is adapted to store the various records outlined above in a section reflecting user-network relation ships or in other words reflecting information on communication processes between the various users and the networking node administrating push-to-talk session. On the basis of this records it is possible to reconstruct the different sessions using inter-relationships of the records to construct session records reflecting user-user relations. These user-user related session records contribute to the calculation of combined performance indicators through the performance indicator calculating unit 42 shown in FIGS. 2 and 6.

In the simplest case, the traffic data base 58 may be a file that stores one record per line together with identifiers in each line such that the records corresponding to one push-to-talk session, to one session initialisation SIP session, or to a transfer protocol RTP talk burst, etc., may be associated for session reconstructions. It is this association between a plurality of different information comprised in the traffic data base 58 that allows for development of a global view on the overall push-to-talk traffic in the communication network.

As shown in FIG. 8, operatively the performance indicator calculating unit 42 executes the steps of querying the traffic database 68 for information records containing information having relevance for the performance indicator and calculating the performance indicator from information comprised in relevant information records. Optionally, relevant information records may be filtered to focus on a subset of push-to-talk sessions and/or active users.

In more detail, the step of calculating performance indicators, both, for dedicated and combined performance indicators may be achieved using the following a procedure for calculating the key performance indicators and usage measures is given as follows:

1. Initially, read the next relevant record from the traffic data base 58.
2. Check whether this record is of a type for which a performance indicator to be calculated.
3. Optionally, filter records by additional constraints focus on a sub-set of subscribers, e.g., a terminal type or packet data capabilities, e.g., according to GPRS/EDGE.
4. Then, calculate the quantity defined by the performance indicator for the particular call considered.
5. Update the statistical function with the value, e.g., add the value to an aggregation counter, and increase the counter calculating the number of eligible calls for the performance indicator.
6. Go back to step (1) until all relevant records are processed.
7. Calculate the performance indicator value by evaluating the function that is relevant for the performance indicator, e.g., if the performance indicator is an average value, divide the value of the aggregation counter with the count value of eligible calls.

In the following an example of protocol interaction for early media establishment and auto-answer mode during set-up of a push-to-talk session will be explained with respect to FIG. 9. Here, also examples for calculation of performance indicators will be given. However, it should be noted that the performance indicators and usage measures described in the following are examples only and not to be construed as limiting the scope of the present invention.

As outlined above, while with active measurement it is only possible to 'see' the performance of dedicated end points where measurement units are located, the passive measurement approach according to the present invention allows to observe a whole or sub-set of carried user push-to-talk traffic at a suitable point in the mobile communication network.

Figure 9:
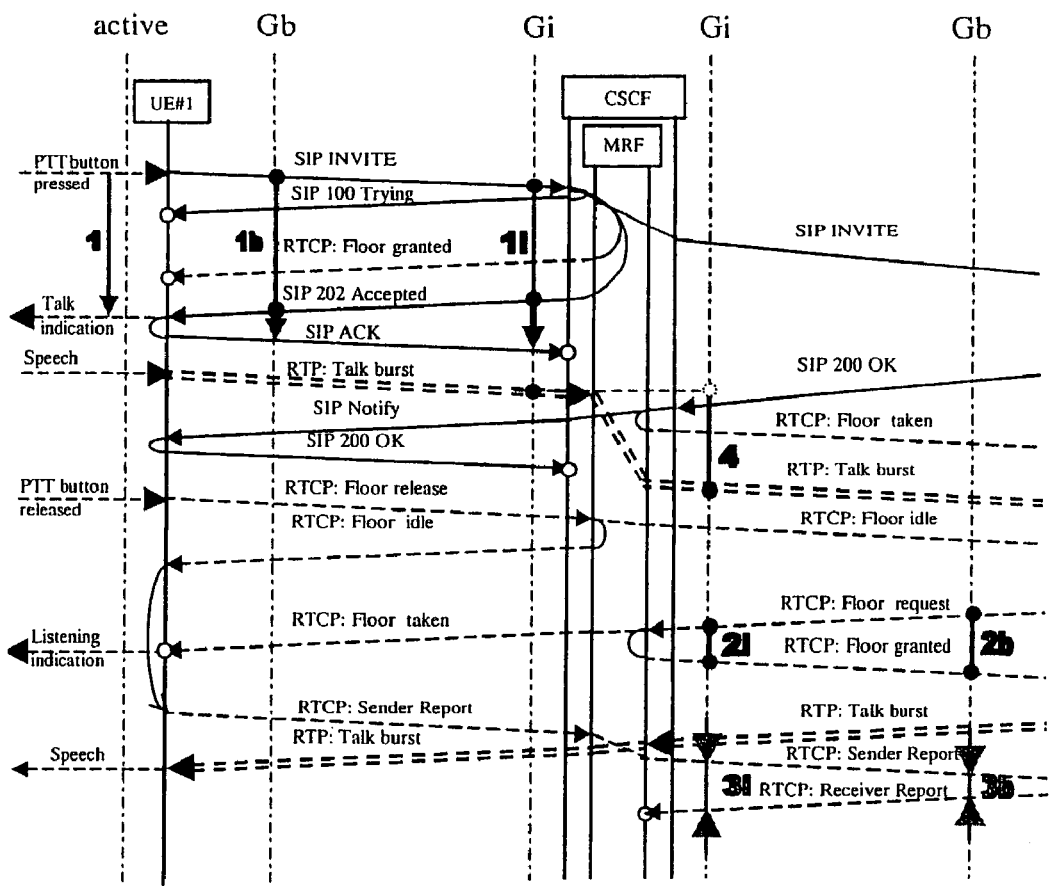
FIG. 9 shows an example protocol interaction for early media establishment and auto-answer mode during set-up of a push-to-talk session.

As shown in FIG. 9, a terminal request generates specific traffic patterns and usually response events are the results of previous network protocol interaction. According to the present invention, it is suggested to track such protocol events that are correlated with terminal events. It is for this correlation that important measures can be obtained which are indicators of the end-to-end performance. Usually, there are also good estimates of the end-to-end performance measures in the case that terminal overheads may be neglected.

As shown in FIG. 9, key performance indicators may be calculated with respect to terminal/network interactions or with respect to terminal/terminal interactions. Any such interaction will generate protocol events which may be tracked in the sense outlined above.

The third terminal/network interaction shown in FIG. 9 is related to session initialisation and divides into the transfer from the user terminal #1 to the media resource function and the application server. Here, messages exchanged are session initialisation invite SIP INVITE, a feedback server SIP 103, followed by a SIP 202 accepted and a SIP ACK, transmitted between the active terminal and the session server/multimedia system along the direction indicated with errors.

As shown in FIG. 9, a second terminal/network interaction relates to the involvement of a further active terminal 10' through exchange of a SIP INVITE and an SIP 200 OK message between the application server/multimedia sub-system and the further active terminal.

Regarding media establishment a first performance indicator would be a push-to-talk call set-up success rate. This performance indicator is the mathematical average of push-to-talk call success indicator that is taken over observed push-to-talk calls. The push-to-talk call success indicator, which is of a value 0 or 1, for a single call may be determined from arrival of the 'SIP 200 OK' message sent for a terminal as response to a 'SIP INVITE' from the same terminal within a specified time interval, according to event 1 in FIG. 8. Here, unsuccessful push-to-talk calls are detected and failure code dependent route calls analysis may also be executed.

A further performance indicator is initial push-to-talk time. This performance indicator reflects the difference of timestamps of 'SIP INVITE' and 'SIP ACK' packets as examples of terminal/network interaction related performance indicators. Due to processing overhead of SIP packets in the terminal 10', this time difference, according to event 1b or 1e in FIG. 9, depending on the measurement location, will always be less than the true value seen at the terminal end point, see event 1 in FIG. 9.

Further, as shown in FIG. 9, additional performance indicators may be derived for terminal/terminal interactions during transfer of talk bursts from related protocol interactions. Here, it should be noted any such performance indicator may be calculated through activation of push-to-talk buttons and release thereof at either active terminal 10 or active terminal 10'.

One such example of performance indication is subsequent push-to-talk time. Here, the time between 'RTCP floor-request' and 'RTCP floor granted', indicated with $2i$ and/or $2b$ in FIG. 9 can be taken as performance indicator. This performance indicator considers the latency of the application server/multimedia system and depends on a measurement location. Here, according to the present invention, it is also suggested to use the fact that after each talk burst, RTCP sender and receiver reports SR/RR are transmitted. Therefore, the true value shown as event 2 in FIG. 9 can be better estimated.

Further, in the downlink direction, the time between the RTPC SR and RTCP RR shown as event $3i$ and $3b$ in the FIG. 9 can be considered as downlink roundtrip time RTT estimate, which is actually missing before exchange of RTCP floor-request and floor granted messages. Therefore, the downlink RTT estimation from a previous talk burst can be used to adjust the subsequent push-to-tone time. Using this approach, according to the present invention the measurement may also be independent of the location of measurement.

A further performance indicator relates to buffering time, e.g., the time between arrival and departure of the very first transfer protocol RTP packet to and from the multimedia system and the media resource function comprised therein in the session of the inviting and invited user, respectively, as marked with event 4 in FIG. 9. The performance indicator buffering time can be considered as latency of real component on the end-to-end voice transmission delay, which is not directly measurable with passive measurements. It should be noted that whenever multiple parties participate in the talk conversation, buffering time can be obtained for each receiver terminal.

While above the push-to-talk set-up success rate initial push-to-tone time, subsequent push-to-tone time, and buffering time have been characterized as typical performance indicators for media establishment and auto-answer mode, further performance indicators characterize push-to-tone service usage.

A first such performance indicator is push-to-talk running share, which is the volume ratio of the push-to-talk traffic volume, e.g., expressed in bytes, to the overall GPRS traffic volume as an observation point.

A further performance indicator is push-to-talk penetration ration which is the ratio of the number of push-to-talk enabled subscribers and the active GPRS subscribers, who were activating at least one packet data PDP context during the measurement period. The performance indicator can be obtained as the number of subscribers with successful session initialisation SIP registration over the number of subscribers having at least one successful packet data context.

A further performance indicator is the push-to-talk call frequency as average amount of time between two successive push-to-talk calls from the same subscriber. The samples for this measures can be obtained from the time between two successful 'SIP INVITE' sessions from the same subscriber.

It should be noted that while above specific embodiments and examples of the present invention and certain definitions of performance indicators are given, according to the present invention also a combined approach to calculation of performance indicators is supported. This is achieved through appropriate architecture of the traffic data base, wherein each single data record characterising push-to-talk traffic has associated thereto a reference to a specific sub-session so that different data records in the data base may be correlated to each other. It is this correlation which, according to the present invention, allows to derive not only a point-to-point evaluation of push-to-talk sessions, but to do statistics on a larger scale considering the traffic in the communication network starting from protocol transactions and related events.

Further, a statistical analysis of a large amount of measurement data captured network-wide, e.g., by using many mobile stations involving many base stations, is very expensive and time-consuming and actually infeasible in view of complexity of mobile communication environments installed in the field.

Another option would be to attach a protocol tester to a network interface, e.g., the Gb-, the Gi- or the Gn-interface, and to capture data packets seen at that point in the communication network.

Also, in Kim P. et al., "IMS-based Push-to-Talk over GPRS/UMTS", Wireless Communications and Networking Conference, 2005, IEEE New Orleans, La., USA, 13-17 Mar. 2005, Piscataway, N.J., USA, IEEE, 13 March 2005, pages 2472-2477, XP010791564, ISBN: 0-7803-8966-2, there is reported the design of a Push-to-Talk operated over a GPRS/UMTS network, so-called Push-to-Talk over Cellular-PoC. There was built a service based on 3GPP IP Multimedia Subsystem IMS to verify the overall PoC approach through an implementation, to discuss design details and to measure results achieved in a live network based on existing GPRS access technology.

Also, in US 2003/0,212,778 A1, there is described an object-oriented modelling approach being used to represent telecommunication services, parameters, and calculation expressions associated with the parameters. Preferably, the Unified Modelling Language UML is used in this regard, and UML sequence diagrams are used to represent the calculation expressions as a sequence of UML methods that accomplishes what is required by the expression.

Nevertheless, the following difficulties arise during analysis of related network interface data, e.g.:

The session initiating protocol SIP messages may be compressed using, e.g., the SigComp protocol. Therefore, related messages may contain state information associated with a push-to-talk session, which implies that the contents of individual session initiating protocol SIP messages are impossible to interpret without tracking previous protocol states.

Important end-to-end performance measures cannot be found directly in protocol data fields, except for voice duality in a downlink direction, where jitter and data loss is available. Also, end-to-end performances require searching corresponding events and related data packets on the basis of complex data packet filters.

The invention claimed is:

1. A method of passive evaluation of push-to-talk traffic in a communication network, said passive evaluation implying non-intrusive monitoring of ongoing processes without interference or disturbance of network operation and push-to-talk traffic is generated through at least one push-to-talk session dividing into a plurality of data transactions according to different classes, a first traffic class covers interactions between a user terminal and the communication network for log-on of user terminals to the communication network, a second traffic class covers interactions between a user terminal and a push-to-talk management node in the communication network for push-to-talk session initialization, and a third traffic class covers exchange of push-to-talk payload data among user terminals, the method comprising the steps:

capturing data transaction in the communication network by time-stamping data packets exchanged during data transactions and storing time stamped captured data packets in a trace memory;

extracting interpretations of data transactions being relevant for push-to-talk, traffic classes, and users, from captured data transactions;

storing a correlation of extracted interpretations of data transactions being relevant for push-to-talk, traffic classes, and users in a traffic data base; and calculation at least on performance indicator with respect to at least one selected push-to-talk session as a function of information stored in the traffic database.

2. The method according to claim 1, wherein the step of capturing data transactions comprises a step of de-multiplexing data packets associated with the data transactions on the basis of time stamped data packets stored in the trace memory and on the basis of configuration information.

3. The method according to claim 1, wherein the step of de-multiplexing comprises the step recognizing data packet types is changed dynamically on the basis of feedback from data transaction analysis.

4. The method according to claim 1, further comprising a step of analyzing control packets exchanged with data transactions establishing a data packet context according to a data packet context protocol to identify communication addresses of new active users.

5. The method according to claim 4, further comprising a step of feeding back a relation between an analyzed communication address and a related active user identification for de-multiplexing of data packets.

6. The method according to claim 4, further comprising a step of forwarding a data packet context record to the traffic database, wherein the data packet context record contains information reflecting the correlation between the analysis of data packets exchanged for establishing a data packet context and the indication of the first traffic class.

7. The method according to claim 6, wherein traffic characteristics of the first traffic class cover active user identification, communication address, and/or data packet context parameters.

8. The method according to claim 1, further comprising a step of analyzing data packets exchanged with data transactions for execution of an initialization of active users participating in a push-to-talk session according to a session initialization and a session description protocol.

9. The method according to claim 8, further comprising a step of de-compressing data packets exchanged with data transactions for executing initialization of active users maintaining an aggregated state memory for decompression such that the states of all data transactions in the second traffic class are represented.

10. The method according to claim 9, further comprising a step of managing the aggregated state memory such that states may be deleted automatically.

11. The method according to claim 9 further comprising a step of forwarding a session record to the traffic database, wherein the session record contains information reflecting the correlation between push-to-talk session identification, the analysis of data packets exchanged for execution of initialization of active users participating in a push-to-talk session, and the indication of the second traffic class.

12. The method according to claim 8, further comprising a step of feeding back information for de-multiplexing of data packets, wherein the information describes communication ports used for exchange of information according to a session payload data transfer protocol and/or a session payload data transfer control protocol, identification of initiated sessions, and/or identification of called active users.

13. The method according to claim 1, further comprising a step of analysing data packets exchanged with data transaction for control of transfer of push-to-talk session payload data and/or for quality reporting according to a session payload data transfer control protocol.

14. The method according to claim 13, further comprising a step of feeding back information for demultiplexing of data packets, wherein the information describes control of transfer of push-to-talk session payload data.

15. The method according to claim 13 further comprising a step of forwarding a payload data transfer control record to the traffic database, wherein the payload data transfer control record reflects the correlation between the related push-to-talk session identification, the analysis of data packets exchanged for control of transfer of push-to-talk session payload data and/or for quality reporting, the identification of corresponding payload data transactions of the same user, and a reference to payload and control data of further participants of the same push-to-talk session.

16. The apparatus according to claim 13, the third analysis unit being adapted to forward a payload data transfer control record to the traffic database, wherein the payload data transfer control record reflects the correlation between the related push-to-talk session identification, the analysis of data packets exchanged for control of transfer of push-to-talk session payload data and/or for quality reporting, the identification of corresponding payload data transactions of the same user, and a reference to payload and control data of further participants of the same push-to-talk session.

17. The method according to claim 1, further comprising a step of analyzing data packets exchanged with data transactions according to a session payload data transfer protocol during transfer of push-to-talk session payload data for reconstruction of related payload data bursts.

18. The method according to claim 17, further comprising a step of forwarding a payload data transfer record to the traffic database, wherein the payload data transfer record reflects the correlation between the related push-to-talk session identification, the analysis of data packets exchanged for transfer of push-to-talk session payload data, the identification of corresponding control data transactions, and a reference to payload and control data of further participants of the same push-to-talk session.

19. The method, according to claim 1, operating on a fourth traffic class covering interactions between a group management node in the communication network and user terminals for group management and access control, and that it comprises a step of analyzing data packets exchanged with data transactions for group management and access control according to a control information data transfer protocol.

20. The method according to claim 19 further comprising a step of forwarding a session management record to the traffic database, wherein the session management record reflects the correlation between push-to-talk session identification and the analysis of data packets exchanged for group management and access control.

21. The method according to claim 20, further comprising a step of feeding back information for demultiplexing of data packets, wherein the information describes user group identifications and/or access lists.

22. The method according to claim 1, performance indicators being defined, respectively, for data packets selected from a group comprising data packets exchanged for establishing a data packet context according to a data packet context protocol according to the first traffic class, data packets exchanged for executing an initialization for active users participating in the push-to-talk session according to a session initialization and a session description protocol according to the second traffic class, data packets exchanged for forwarding group management and access control information to each active user according to a control information data transfer protocol according to the fourth traffic class, data packets exchanged for transfer of push-to-talk payload data according to a session payload data transfer protocol according to the third traffic class, and data packets exchanged for control of push-to-talk payload data transfer according to a payload data transfer control protocol according to the third traffic class.

23. The method according to claim 22, wherein the step of calculating at least one performance indicator comprises the steps:
  querying the traffic database for information records containing information having relevance for the performance indicator; and
  calculating the performance indicator from information comprised in relevant information records.

24. The method according to claim 23, further comprising the step of filtering relevant information records to focus on a subset of push-to-talk sessions and/or active users.

25. The method according to claim 23, wherein the step of calculating the performance indicator is achieved by applying a statistical function onto information comprised in relevant information records.

26. The method, according to claim 1, being executed at a standard network interface of the communication network.

27. An apparatus adapted for passive evaluation of push-to-talk traffic in a communication network, wherein push-to-talk traffic is generated through at least one push-to-talk session dividing into a plurality of data transactions according to different traffic classes, a first traffic class covers interactions between a user terminal and the communication network for logon of user terminals to the communication network, a second traffic class covers interactions between a user terminal and a push-to-talk management node in the communication network for push-to-talk session initialization, and a third traffic class covers push-to-talk payload data exchange among user terminals, said passive evaluation implying non-intrusive monitoring of ongoing processes without interference or disturbance of network operation, the apparatus comprising:

a capturing unit, adapted to capture data transactions in the communication network, the capturing unit comprising:
a time-stamping unit adapted to time stamp data packets exchanged during data transactions and a trace memory adapted to store time stamped captured data packets in a trace memory;
an extracting unit adapted to extract interpretations of data transactions being relevant for push-to-talk, traffic classes, and users, from captured data transactions;
a storing unit adapted to store a correlation of extracted interpretations of data transactions being relevant for push-to-talk, traffic classes, and users in a traffic data base; and
a calculation unit adapted to calculate at least one performance indicator with respect to at least one selected push-to-talk session as a function of information stored in the traffic database.

28. The apparatus according to claim 27, the capturing unit comprising a de-multiplexing unit adapted to de-multiplex data packets associated with the data transactions on the basis of time stamped data packets stored in the trace memory and on the basis of configuration information.

29. The apparatus according to claim 28, wherein the de-multiplexing unit is adapted to recognize data packet types dynamically on the basis of feedback from data transaction analysis.

30. The apparatus according to claim 27, further comprising a first analysis unit adapted to analyze control packets exchanged with data transactions establishing a data packet context according to a data packet context protocol to identify communication addresses of new active users.

31. The apparatus according to claim 30, the first analysis unit being adapted to feedback a relation between an analyzed communication address and a related active user identification for demultiplexing of data packets.

32. The apparatus according to claim 30, wherein the first analysis unit being adapted to forward a data packet context record to the traffic database, wherein the data packet context record contains information reflecting the correlation between the analysis of data packets exchanged for establishing a data packet context and the indication of the first traffic class.

33. The apparatus according to claim 32, wherein traffic characteristics of the first traffic class cover active user identification, communication address, and/or data packet context parameters.

34. The apparatus according to claim 27, further comprising a second analysis unit adapted to analyze data packets exchanged with data transactions for execution of an initialization of active users participating in a push-to-talk session according to a session initialization and a session description protocol.

35. The apparatus according to claim 34, further comprising a de-compression unit adapted to decompress data packets exchanged with data transactions for executing initialization of active users and to maintain an aggregated state memory for decompression such that the states of all data transactions in the second traffic class are represented.

36. The apparatus according to claim 35, the de-compression unit being adapted to manage the aggregated state memory such that states may be deleted automatically.

37. The apparatus according to claim 34, the second analysis unit being adapted to feedback information for de-multiplexing of data packets, wherein the information describes communication ports used for exchange of information according to a session payload data transfer protocol and/or a session payload data transfer control protocol, identification of initiated sessions, and/or identification of called active users.

38. The apparatus according to claim 34, the second analysis unit being adapted to forward a session record to the traffic database, wherein the session record contains information reflecting the correlation between push-to-talk session identification, the analysis of data packets exchanged for execution of initialization of active users participating in a push-to-talk session, and the indication of the second traffic class.

39. The apparatus according to claim 27, further comprising a third analysis unit adapted to analyze data packets exchanged with data transactions for control of transfer of push-to-talk session payload data and/or for quality reporting according to a session payload data transfer control protocol.

40. The apparatus according to claim 39, the third analysis unit being adapted to feedback information for de-multiplexing of data packets, wherein the information describes control of transfer of push-to-talk session payload data.

41. The apparatus according to claim 27, further comprising a fourth analysis unit adapted to analyze data packets exchanged with data transactions according to a session payload data transfer protocol during transfer of push-to-talk session payload data for reconstruction of related payload data bursts.

42. The apparatus according to claim 41, the fourth analysis unit being adapted to forward a payload data transfer record to the traffic database, wherein the payload data transfer record reflects the correlation between the related push-to-talk session identification, the analysis of data packets exchanged for transfer of push-to-talk session payload data, the identification of corresponding control data transactions, and a reference to payload and control data of further participants of the same push-to-talk session.

43. The apparatus according to claim 27, operating on a fourth traffic class covering interactions between a group management node in the communication network and user terminals for group management and access control, and that it comprises a fifth analysis unit adapted to analyze data packets exchanged with data transactions for group management and access control according to a control information data transfer protocol.

44. The apparatus according to claim 43, the fifth analysis unit being adapted to feedback information for de-multiplexing of data packets, wherein the information describes user group identifications and/or access lists.

45. The apparatus according to claim 43 the fifth analysis unit being adapted to forward a session management record to the traffic database, wherein the session management record reflects the correlation between push-to-talk session identification and the analysis of data packets
exchanged for group management and access control .

46. The apparatus according to claim 27 the calculation unit being adapted to calculate performance indicators that are defined, respectively, for data packets selected from a group comprising data packets exchanged for establishing a data packet context according to a data packet context protocol according to the first traffic class, data packets exchanged for executing an initialization for active users participating in the push-to-talk session according to a session initialization and a session description protocol according to the second traffic class, data packets exchanged for forwarding group management and access control information to each active user according to a control information data transfer protocol according to the fourth traffic class, data packets exchanged for transfer of push-to-talk payload data according to a session payload data transfer protocol according to the third traffic class, and data packets exchanged for control of push-to-talk payload data transfer according to a payload data transfer control protocol according to the third traffic class.

47. The apparatus according to claim 46, the calculation unit comprising:

a querying unit adapted to query the traffic data base for information records containing information having relevance for the performance indicator; and a calculator adapted to calculate the performance indicator from information comprised in relevant information records.

48. The apparatus according to claim 47 the calculator being adapted to apply a statistical function onto information comprised in relevant information records.

49. The apparatus according to claim 46 further comprising a filtering unit adapted to filter relevant information records to focus on a subset of push-to-talk sessions and/or active users.

50. The apparatus according to claim 27 being installed at a standard network interface of communication network.

* * * * *

UNITED STATES PATENT AND TRADEMARK OFFICE
CERTIFICATE OF CORRECTION

PATENT NO. : 7,865,207 B2
APPLICATION NO. : 11/910127
DATED : January 4, 2011
INVENTOR(S) : Malomsoky et al.

It is certified that error appears in the above-identified patent and that said Letters Patent is hereby corrected as shown below:

In Fig. 6, Sheet 5 of 8, for Tag "62", in Line 2, delete "Anylsis" and insert -- Analysis --, therefor.

In Column 2, Line 15, delete "interface It" and insert -- interface (It) --, therefor.

In Column 3, Line 28, delete "Sigcomp" and insert -- SigComp --, therefor.

In Column 6, Line 63, delete "DRAWING" and insert -- DRAWINGS --, therefor.

In Column 14, Line 51, delete "relation ships" and insert -- relationships --, therefor.

In Column 16, Line 50, delete "RTPC SR" and insert -- RTCP SR --, therefor.

In Columns 17 &18, Lines 41-67 & 1-18, delete "Further, a statistical analysis of a large amount of.....................on the basis of complex data packet filters.".

In Column 20, Line 12, in Claim 19, delete "method," and insert -- method --, therefor.

In Column 20, Line 61, in Claim 26, delete "method," and insert -- method --, therefor.

Signed and Sealed this
Thirty-first Day of May, 2011

David J. Kappos
*Director of the United States Patent and Trademark Office*